US010764788B2

(12) United States Patent
Ali et al.

(10) Patent No.: US 10,764,788 B2
(45) Date of Patent: Sep. 1, 2020

(54) MANAGING BANDWIDTH IN MOBILE TELECOMMUNICATIONS NETWORKS (71) Applicant: International Business Machines Corporation, Armonk, NY (US)

(72) Inventors: Asmahan Ali, Highland, NY (US); Ali Y. Duale, Poughkeepsie, NY (US); Mustafa Mah, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/825,140

(22) Filed: Nov. 29, 2017

(65) Prior Publication Data
US 2019/0166521 A1    May 30, 2019

(51) Int. Cl.
*H04W 28/20* (2009.01)
*H04W 28/06* (2009.01)
*H04W 28/26* (2009.01)
*H04W 72/04* (2009.01)
*H04M 15/00* (2006.01)
(Continued)

(52) U.S. Cl.
CPC ......... *H04W 28/20* (2013.01); *H04L 12/1403* (2013.01); *H04M 15/76* (2013.01); *H04M 15/765* (2013.01); *H04M 15/77* (2013.01); *H04M 15/78* (2013.01); *H04M 15/781* (2013.01); *H04M 15/783* (2013.01); *H04W 4/24* (2013.01); *H04W 28/06* (2013.01); *H04W 28/26* (2013.01); *H04W 72/0493* (2013.01)

(58) Field of Classification Search
CPC . H04W 28/20; H04W 72/0493; H04W 28/06; H04W 28/26

USPC ......................................................... 370/468
See application file for complete search history.

(56) References Cited

U.S. PATENT DOCUMENTS

2007/0299789 A1\* 12/2007 Young .................... G06Q 30/02
705/400
2012/0155296 A1\* 6/2012 Kashanian .......... H04L 12/1417
370/252
(Continued)

FOREIGN PATENT DOCUMENTS

DE         3901493 A1    9/1989
EP         2592780 A2    5/2013
(Continued)

OTHER PUBLICATIONS

Lin et al., "Dynamic Bandwidth Aggregation for a Mobile Device with Multiple Interfaces", Jan. 2005, 8 pages.

*Primary Examiner* — Robert C Scheibel
*Assistant Examiner* — Mohammed S Chowdhury
(74) *Attorney, Agent, or Firm* — William H. Hartwell (57) ABSTRACT In one embodiment, in accordance with the present invention, a method, computer program product, and system for managing and redistributing unused bandwidth between devices connected to a mobile telecommunications network is provided. One or more computer processors determine a predicted amount of data to be used by a mobile device. The one or more computer processors determine a surplus of allocated data based on whether the predicted amount of data is less than an allocated amount of data. The one or more computer processors, upon determining that there is a surplus of allocated data, move the surplus of allocated data to a data pool to be used by one or more additional mobile devices.

20 Claims, 5 Drawing Sheets

(51) Int. Cl.
*H04W 4/24* (2018.01)
*H04L 12/14* (2006.01)

(56) References Cited

U.S. PATENT DOCUMENTS

| | | | |
|---|---|---|---|
| 2014/0018033 A1* | 1/2014 | Luna | H04W 28/0215 |
| | | | 455/405 |
| 2014/0337519 A1 | 11/2014 | Raleigh et al. | |
| 2015/0118999 A1* | 4/2015 | Merchant | H04W 8/186 |
| | | | 455/411 |
| 2015/0271689 A1* | 9/2015 | Rout | H04W 24/04 |
| | | | 709/217 |
| 2016/0007387 A1 | 1/2016 | Adib et al. | |
| 2016/0143040 A1 | 5/2016 | Rivard et al. | |

FOREIGN PATENT DOCUMENTS

| | | | |
|---|---|---|---|
| WO | 2008002854 A3 | 1/2008 | |
| WO | 2015148428 A1 | 10/2015 | |

* cited by examiner

MANAGING BANDWIDTH IN MOBILE TELECOMMUNICATIONS NETWORKS

BACKGROUND

The present invention relates generally to the field of mobile telecommunications networks, and more particularly to managing and redistributing unused bandwidth between devices connected to a mobile telecommunications network.

Smart devices (e.g., mobile phones, tablets and laptop computers) have become popular in recent years. Applications on smart devices typically require an internet connection to operate, whether it's a video streaming application or social media application. Two common methods of connecting a device to the internet are via a Wi-Fi connection (e.g., in a home or hotspots provided by a service provider or business owner), and via a mobile data plan (e.g., a service provided by telecommunication companies that provide internet service). Currently, it is common that a user buys a data plan which can be shared among multiple users.

SUMMARY

Embodiments of the present invention disclose a method, computer program product, and system for managing and redistributing unused bandwidth between devices connected to a mobile telecommunications network. One or more computer processors determine a predicted amount of data to be used by a mobile device. The one or more computer processors determine a surplus of allocated data based on whether the predicted amount of data is less than an allocated amount of data. The one or more computer processors, upon determining that there is a surplus of allocated data, move the surplus of allocated data to a data pool to be used by one or more additional mobile devices.

DETAILED DESCRIPTION

Embodiments in accordance with the present invention recognize that some mobile users with a cellular data plan do not use the entire bandwidth that is paid for. Additionally, some mobile users choose not to have a cellular data plan yet still want internet connectivity where accessible Wi-Fi is not available. Embodiments of the present invention enable cellular data plan owners to smartly anticipate, or predict, a monthly bandwidth requirement and proactively provide any excessive data allocation in a data minute pool for redistribution.

Embodiments of the present invention benefit smart device users by enabling data plan owners to utilize an entire data plan share. This is done by identifying and learning the owner's usage habits, then ensuring that unused bandwidth is offered for redistribution in a "data minute pool" marketplace. Additionally, embodiments of the present invention enable a smart device owner with no data plan contract to gain access to the internet by obtaining bandwidth from the "data minute pool" marketplace on demand.

Figure 1:
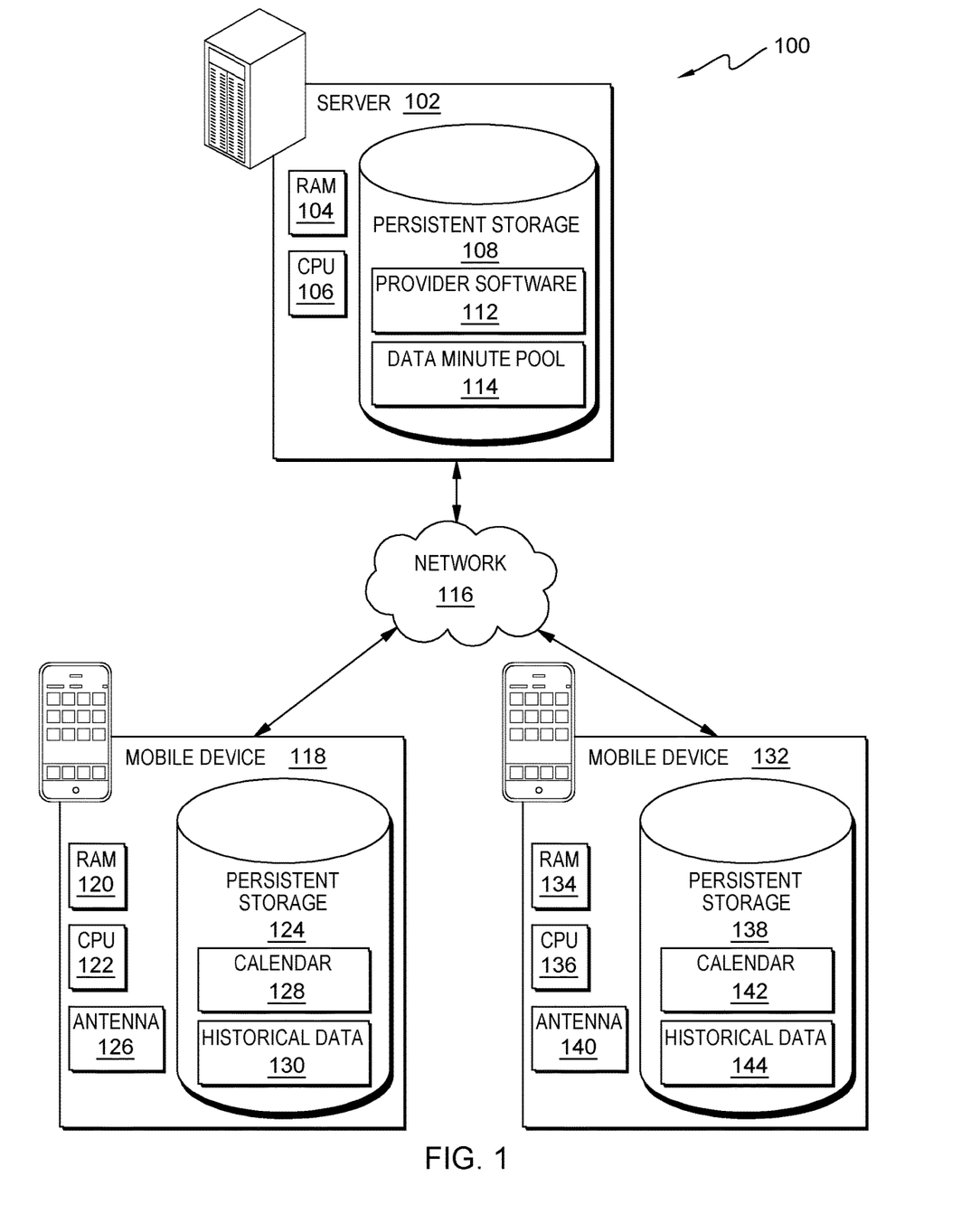
FIG. 1 is a functional block diagram illustrating a distributed data processing environment, in an embodiment in accordance with the present invention.

Embodiments in accordance with the present invention will now be described in detail with reference to the Figures. FIG. 1 is a functional block diagram, generally designated 100, illustrating a distributed data processing environment, in an embodiment in accordance with the present invention.

Distributed data processing environment 100 includes server 102, mobile device 118, mobile device 132, and other computing devices (not shown), all interconnected over network 116. Server 102 includes random access memory (RAM) 104, central processing unit (CPU) 106, and persistent storage 108. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 102 may represent server computing systems utilizing multiple computers as a server system, such as in a distributed computing environment. In general, server 102 is representative of any electronic device or combinations of electronic devices capable of executing machine-readable program instructions and communicating with mobile device 118 and mobile device 132 via network 116 and with various components and devices (not shown) within distributed data processing environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Server 102 may include internal and external hardware components, as depicted and described in further detail with respect to FIG. 5.

Provider software 112 and data minute pool 114 are stored in persistent storage 108, which also includes operating system software (not shown), as well as software that enables server 102 to communicate with mobile device 118, mobile device 132, and other computing devices (not shown) of distributed data processing environment 100 over a data connection on network 116. In other example embodiments, provider software 112 and data minute pool 114 may be components of an operating system software. In other example embodiments, persistent storage 108 includes a list, file, and/or a database (not shown) of no-charge wireless communication access points that can be downloaded to or accessed by mobile device 118 and/or mobile device 132.

Provider software 112 is a computer program, or set of computer programs, that is stored in persistent storage 108. Provider software 112 enables a user to monitor and predict mobile data usage for mobile data plan users, reallocate (e.g., sell) unused mobile data plan minutes to a data minute (or "data bandwidth") pool, and recall previously reallocated data plan minutes from the data minute pool. Additionally, provider software 112 enables a user with no available data bandwidth to purchase available bandwidth from data minute pool 114.

Data minute pool 114 is a computer program, or set of computer programs, that is stored in persistent storage 108. In one example embodiment, data minute pool 114 enables provider software 112 to move a plurality of surplus data plan minutes (e.g., data plan minutes determined to be more than a predicted amount of data minutes required by a user), to a data minute pool, such as data minute pool 114. In another example embodiment, data minute pool 114 can historically track the amount of data plan minutes that have been redistributed by a user. In another example embodiment, data minute pool 114 enables provider software 112 to recall previously redistributed data plan minutes. And in yet another example embodiment, data minute pool 114 enables provider software 112 to obtain data minutes for a mobile device user based on a predicted amount of data usage. The data "minutes" stored in data minute pool 114 may include any measure of data consumption and/or bandwidth known (or yet to be known) in the art. For example, in some embodiments, data minutes are measured in bits and/or bytes (with or without their respective kilo/mega/giga/tera/ etc. prefixes) representing an amount of bandwidth that a user may consume over a telecommunications network. In other embodiments, data minutes are measured in amounts of time—such as minutes—for which a user may consume data over the telecommunications network.

In FIG. 1, network 116 is shown as the interconnecting fabric between server 102, mobile device 118, mobile device 132, and with various components and devices (not shown) within distributed data processing environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between server 102, mobile device 118, and with various components and devices (not shown) within distributed data processing environment 100.

Mobile device 118 is included in distributed data processing environment 100. Mobile device 118 includes random access memory (RAM) 120, central processing unit (CPU) 122, persistent storage 124, and antenna 126. Mobile device 118 may be a Web server, or any other electronic device or computing system, capable of processing program instructions and receiving and sending data. In some embodiments, mobile device 118 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, mobile device 118 may represent server computing systems utilizing multiple computers as a server system, such as in a distributed computing environment. In general, mobile device 118 is representative of any electronic devices or combinations of electronic devices capable of executing machine-readable program instructions and communicating with server 102 and mobile device 132 via network 116 and with various components and devices (not shown) within distributed data processing environment 100. In other example embodiments, network 116 enables mobile device 118 and/or mobile device 132 to access various Internet-accessible resources (not shown), such information related to the locations of non-charge wireless access points.

Mobile device 118 includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information. Calendar 128 is stored in persistent storage 124, which also includes operating system software, as well as software that enables mobile device 118 to detect and establish a connection to server 102, mobile device 132, and communicate with other computing devices (not shown) of distributed data processing environment 100 over a data connection on network 116.

Calendar 128 is a computer program, or set of computer programs, that is stored in persistent storage 124. In one example embodiment, calendar 128 contains calendar entries relating to, but not limited to, one or more meetings, appointments, all day events, anniversaries, and reminders, wherein the calendar entries contain location information. In one example embodiment, the location information includes information relating to an address of the location.

Historical data 130 is a computer program, or set of computer programs, that is stored in persistent storage 124. In one example embodiment, historical data 130 can contain data relating to a plurality of applications used by mobile device 118 and information relating to the amount of data that has been transmitted and received by the plurality of applications via antenna 126, as well as over a Wi-Fi data connection. Historical data 130 can be accessed by provider software 112 to predict a certain level of data usage for a user of mobile device 118.

Mobile device 118 includes antenna 126 that includes a radio transmitter and a radio receiver (not pictured). Antenna 126 is used by mobile device 118 to transmit and receive radio signals over a telecommunications network. For example, antenna 126 is used by mobile device 118 when transmitting and receiving data signals relating to global positioning system (GPS) data, voice data, text data, Wi-Fi data, and Bluetooth data.

Mobile device 132 is included in distributed data processing environment 100. In the present example embodiment, mobile device 132 is representative of mobile device 118, including RAM 134, CPU 136, persistent storage 138 that contains calendar 142 and historical data 144, and antenna 140. Calendar 142 is a computer program, or sets of computer programs, that are stored in persistent storage 138. In one example embodiment, calendar 142 contains calendar entries relating to, but not limited to, one or more meetings, appointments, all day events, anniversaries, and reminders, and wherein the calendar entries contain location information. In one example embodiment, the location information can include information relating to an address of the location.

Figure 2:
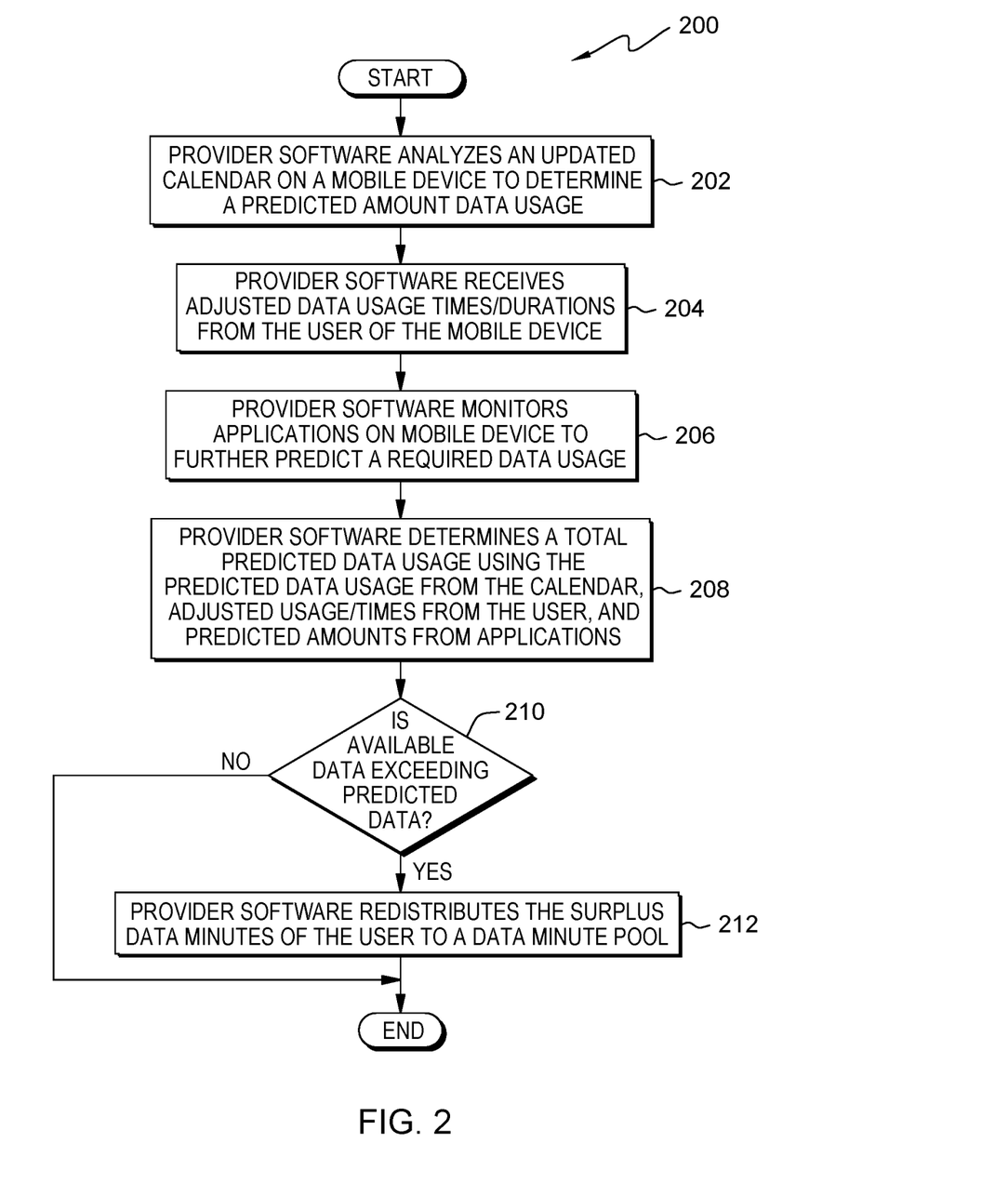
FIG. 2 is a flowchart depicting operational steps of a provider software, on a server within the distributed data processing environment of FIG. 1, for determining a predicted amount of data usage and selling surplus data minutes to a data minute pool, in an embodiment in accordance with the present invention.

FIG. 2 is a flowchart, generally designated 200, depicting operational steps of a provider software, on a server within the distributed data processing environment of FIG. 1, for determining a predicted amount of data usage and redistributing surplus data minutes to a data minute pool, in an embodiment in accordance with the present invention. In one example embodiment, a user of mobile device 118 is enrolled in, also referred to as subscribed to, a mobile data plan that includes 10 GB of data at the beginning of each billing cycle. For example, the user of mobile device 118 is allocated 10 GB of data for the month (e.g., the billing cycle), to be used by one or more authorized mobile devices of the user's mobile data plan.

Provider software 112 analyzes an updated calendar on a mobile device to determine a predicted amount data usage as depicted in step 202. For example, provider software 112 can access calendar 128 on mobile device 118 to determine one or more calendar entries relating to, but not limited to, one or more meetings, one or more appointments, all day events, one or more anniversaries, and one or more reminders, and wherein the one or more calendar entries contain location information. Using the location information of the one or more calendar entries, provider software 112 can determine a predicted amount of data usage from the user of mobile device 118's mobile data plan. For example, provider software 112 can determine one or more routes to an upcoming event for a calendar entry on calendar 128. For each of the one or more routes to the upcoming event, provider software can determine a number of available Wi-Fi hotspots that the user of mobile device 118 can use for a certain time period to reduce the amount of data minutes used on the mobile data plan. Upon determining the amount of predicted Wi-Fi access for each of the one or more routes, provider software 112 can then calculate an average amount of predicted Wi-Fi usage. Additionally, provider software 112 can use historical data 130 to determine one or more required, or typically used, applications, that require internet access, on mobile device 118 and are typically used by the user of mobile device 118 when traveling to the upcoming event. Upon determining a predicted amount of Wi-Fi usage, provider software 112 can then predict an amount of required data minutes the user of mobile device 118 can use from the mobile data plan. Provider software 112 can then repeat this process for all calendar entries on calendar 128 to predict a number of data minutes required for a month. In other example embodiments, if provider software 112 cannot identify no-charge Wi-Fi hotspots at one or more locations along a planned route of the user of mobile device 118, then calendar 128 or another program (not shown) of mobile device 118 can query various internet-accessible resources to determine whether no-charge Wi-Fi hotspots occur at one or more locations along the planned route. Subsequently, if one or more no-charge Wi-Fi hotspots are identified from an Internet accessible resource, then the locations of the identified no-charge Wi-Fi hotspots are communicated to provider software 112 and calendar 128 for inclusion in one or more determinations.

In step 204, provider software 112 receives adjusted data usage times/durations from the user of the mobile device. For example, a user of mobile device 118 can establish a connection to provider software 112 on server 102, via a web interface, and verify, or approve, the predicted amount of data minutes that was calculated for the month. For example, using a web browser feature of mobile device 118, the user of mobile device 118 can adjust the number of predicted data minutes distributed on data minute pool 114 by adding additional minutes to data minute pool 114 (e.g., to account for a business trip that is not entered in calendar 128, or by removing allocated minutes on data minute pool 114 (e.g., to account for a previously planned trip that has not been removed from calendar 128).

Provider software 112 monitors applications on mobile device to further predict a required data usage as depicted in step 206. For example, provider software 112 can monitor one or more applications on mobile device 118 to determine an additional amount of used data minutes of the mobile data plan. For example, while traveling to a location, the user of mobile device 118 uses a global positioning system (GPS) feature (e.g., a mobile map application), to receive directions to the location. Provider software 112 determines the amount of used data minutes used by the mobile map application by monitoring the amount of data the mobile map application transmits and receives over antenna 126. For example, provider software 112 can additionally predict required data based on the user of mobile device 118 prior data usage, including peak data usage used for the GPS application of mobile device 118.

In step 208, provider software 112 determines a total predicted data usage using the predicted data usage from the calendar, adjusted usage/times from the user, and predicted amounts from applications. For example, provider software 112 calculates a total predicted data amount by summing the predicted data usage from the calendar, the adjusted usage/times from the user, and the predicted amounts from applications.

In decision step 210, provider software 112 determines if the user's data plan minutes are larger than the predicted data usage. If provider software 112 determines that the user's data plan minutes are larger than the predicted data usage ("Yes" branch, decision 210), provider software 112 redistributes the surplus data minutes of the user to a data minute pool as depicted is step 212. For example, provider software 112 determines if the sum of the predicted data amount is less than the available data minutes the user of mobile device 118 has left on a mobile data plan. If the user's available mobile data plan minutes is greater than the sum of the predicted data amount, provider software 112 can redistribute the difference in data minute pool 114. For example, in the example embodiment where the user of mobile device 118 has a mobile data plan that includes 10 GB of data at the beginning of each billing cycle, provider software can predict that the user only needs 6 GB for the month and sell 4 GB on data minute pool 114. If provider software 112 determines that the user's data plan minutes are not larger than the predicted data usage ("No" branch, decision 210), provider software 112 skips step 212 as depicted in FIG. 2. In another example embodiment, provider software 112 can prompt the user of mobile device 118 to verify the surplus data minutes to be sold on data minute pool 114. For example, upon determining that the user's data plan minutes are larger than the predicted data usage, provider software 112 can prompt the user by displaying a message on a user interface (not shown) of mobile device 118. If the user selects "Yes", the surplus data minutes are sold on data minute pool 114. If the user selects "No", the surplus data minutes are not sold on data minute pool 114.

Figure 3:
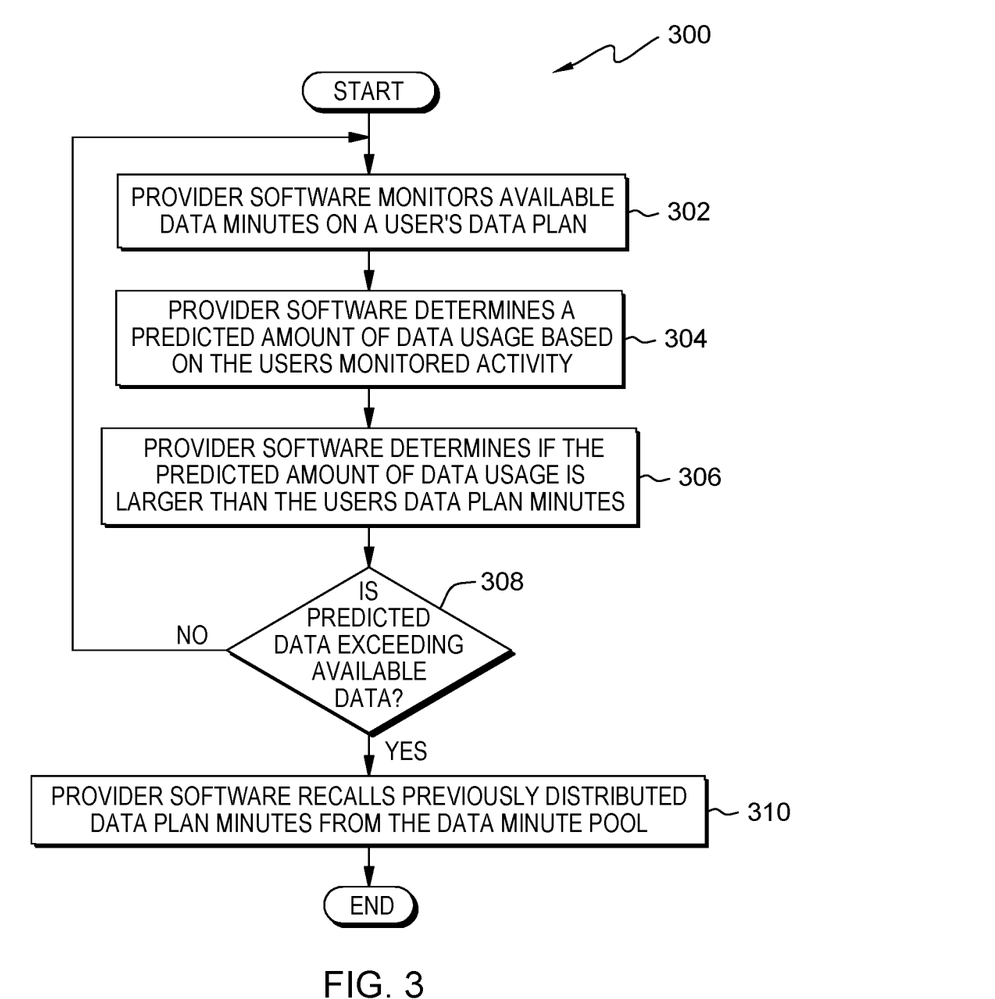
FIG. 3 is a flowchart depicting operational steps of a provider software, on a server within the distributed data processing environment of FIG. 1, for determining a predicted amount of data usage based on monitored activity then recalling previously sold data plan minutes from the data minute pool, in an embodiment in accordance with the present invention.

FIG. 3 is a flowchart, generally designated 300, depicting operational steps of a provider software, on a server within the distributed data processing environment of FIG. 1, for determining a predicted amount of data usage based on monitored activity then recalling previously sold data plan minutes from the data minute pool, in an embodiment in accordance with the present invention. Continuing the example embodiment of FIG. 2, where provider software 112 determines that the user of mobile device 118 has a surplus of available data minutes on a mobile data plan based on a predicted amount of required data minutes and the surplus data minutes are sold on data minute pool 114, provider software 112 then monitors mobile device 118 to determine if the user's data minute usage is within the predicted amount of data minutes that was calculated previously.

Provider software 112 monitors available data minutes on a user's data plan as depicted in step 302. For example, continuing the example embodiment where the user of mobile device 118 has a mobile data plan that includes 10 GB of data at the beginning of each billing cycle, and provider software predicts that the user only needs 6 GB for the month and allocated 4 GB on data minute pool 114, provider software 112 then monitors the remaining data minutes left on the users 6 GB data minute plan to ensure the user does not go over the predicted amount.

In step 304, provider software 112 determines a predicted amount of data usage based on the user's monitored activity. For example, provider software 112 continually monitors one or more applications on mobile device 118, that transmit and receive data using antenna 126, to determine a current data minute usage. Additionally, provider software 112 continually monitors calendar 126 to predict a required data amount as new calendar entries are added/removed to calendar 126. For example, the user of mobile device 118 can add one or more additional business trips that increase the predicted data amount. Additionally, the user of mobile device can binge watch a television series while not using a Wi-Fi connection and consume a large portion of the available minutes in the mobile data plan.

Provider software 112 determines if the predicted amount of data usage is larger than the user's data plan minutes as depicted in step 306. For example, upon adding an additional calendar entry, relating to an upcoming business trip, to calendar 126, provider software 112 determines a new predicted amount of data usage based on the information of the upcoming business trip. For example, provider software 112 calculates a total predicted data amount by summing the predicted data usage from the calendar, the adjusted usage/times from the user, and the predicted amounts from applications as described in step 208.

In decision step 308, provider software 112 determines if the predicted data amount is exceeding the available data. For example, upon adding an additional calendar entry, relating to an upcoming business trip, to calendar 126, provider software 112 determines that the predicted amount of data usage is now larger than the available data plan minutes (e.g., the remaining data plan minutes of the available 6 GB on the user's mobile data plan). If provider software 112 determines that the predicted data amount does exceed the available data on the user's mobile data plan ("Yes" branch, decision step 308), provider software 112 recalls previously distributed data plan minutes from data minute pool 114 as depicted in step 310. For example, provider software 112 can recall, or re-add, the required data minutes from data minute pool 114. For example, provider software 112 can determine the amount of data minutes to recall from data minute pool 114 by finding the difference of the required data minutes and the available data minutes on the mobile data plan. If provider software 112 determines that the predicted data amount does not exceed the available data on the user's mobile data plan ("Yes" branch, decision step 308), provider software 112 repeats steps 302 through 308 as depicted on FIG. 3.

Figure 4:
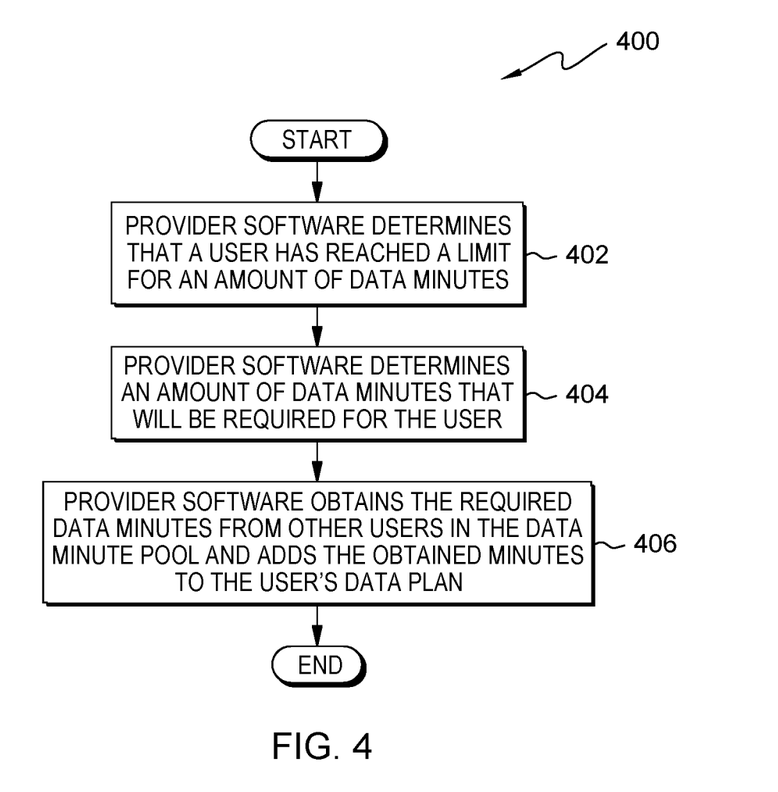
FIG. 4 is a flowchart depicting operational steps of a provider software, on a server within the distributed data processing environment of FIG. 1, for determining an amount of data minutes that will be required for a user then purchasing the required data minutes from the data minute pool, in an embodiment in accordance with the present invention.

FIG. 4 is a flowchart, generally designated 400, depicting operational steps of a provider software, on a server within the distributed data processing environment of FIG. 1, for determining an amount of data minutes that will be required for a user then obtaining the required data minutes from the data minute pool, in an embodiment in accordance with the present invention. In an example embodiment, a user of mobile device 132 can opt out of a mobile data plan and automatically obtain data minutes ala carte from data minute pool 114. In other example embodiments, a user with a mobile data plan can use all available data minutes (e.g., 10 GB for the month) on a mobile data plan and use provider software 112 to obtain additional minutes. In other example embodiments, a user utilizing data minute pool 114 previously deposited excess data minutes during a different period that were consumed by other users that currently have deposited their excess data minutes for this period. The user of device 118 may utilize a "credit" associated with data minute pool 114 for a previous plan to acquire additional resources during the current period.

Provider software 112 determines that a user has reached a limit for an amount of data minutes as depicted in step 402. For example, a user of mobile device 132 uses all the purchased data minutes of a mobile data plan.

In step 404, provider software 112 determines an amount of data minutes that will be required for the user. For example, provider software 112 calculates a total required data amount by summing the predicted data usage from the calendar, the adjusted usage/times from the user, and the predicted amounts from applications. In another example embodiment, the user of mobile device 132 can use a web interface for provider software 112 to manually request a desired amount of data minutes (e.g., 3 GB), from data minute pool 114.

Provider software 112 obtains the required data minutes from other users in the data minute pool and adds the obtained minutes to the user's data plan as described in step 406. For example, provider software 112 purchases the required data minutes from data minute pool 114 and adds them to the user of mobile device 132 mobile data plan.

Figure 5:
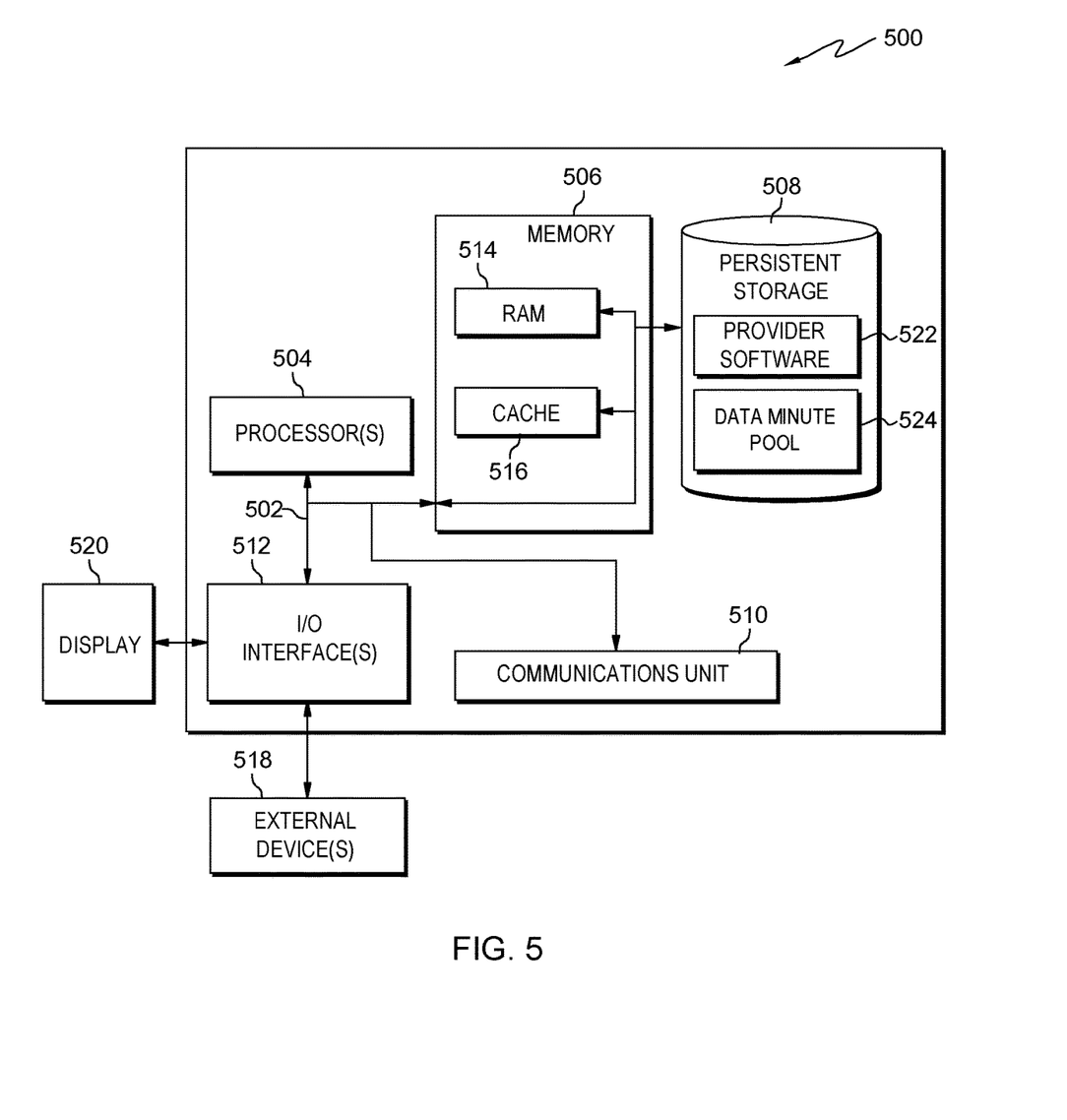
FIG. 5 depicts a block diagram of components of the server executing the provider software, in an embodiment in accordance with the present invention.

FIG. 5 depicts a block diagram, generally designated 500, of components of the server executing the provider software, in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Provider software 112 and data minute pool 114 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 116 and mobile device 118, and 132. In these examples, communications unit 510 includes one or more network interface cards. Communications unit 510 may provide communications through the use of either or both physical and wireless communications links. Provider software 112 and data minute pool 114 may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., provider software 112 and data minute pool 114, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" acting as a single "user."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

"Automatically" means "without any human intervention."

These terms, while difficult to precisely define, are well understood by those skilled in the art.

What is claimed is:

1. A computer-implemented method comprising:
   determining, by one or more computer processors, a predicted amount of data, wherein the predicted amount of data is a predicted amount of data minutes to be used on a data plan by a mobile device;

determining, by one or more computer processors, a surplus of allocated data minutes on the data plan based on whether the predicted amount of data minutes is less than an allocated amount of data minutes;

upon determining that there is a surplus of allocated data minutes on the data plan, moving, by one or more computer processors, the surplus of allocated data minutes to a data minute pool, wherein the data minute pool is stored on a server separate from and accessible by the mobile device;

enabling, by one or more computer processors, a no-charge access point, wherein the no-charge access point provides access to the data minute pool on the server to one or more additional mobile devices without requiring the one or more additional devices to be associated with respective data plans;

upon receiving a request for data minutes from an additional mobile device of the one or more additional mobile devices via the no-charge access point, allocating, by one or more compute processors, the requested data minutes to the additional mobile device, wherein allocating the requested data minutes to the additional mobile device includes removing the requested data minutes from the data minute pool and adding the requested data minutes to allocated data minutes for the additional mobile device; and upon reaching a defined data minute limit by the mobile device, recalling, by one or more computer processors, data minutes from the data minute pool, wherein the recalled data minutes from the data minute pool were previously identified as surplus data minutes, and wherein recalling the recalled data minutes includes removing the recalled data minutes from the data minute pool and re-adding the recalled data minutes to the allocated data minutes for the mobile device.

2. The computer-implemented method of claim 1, wherein determining a predicted amount of data, wherein the predicted amount of data is a predicted amount of data minutes to be used on a data plan by a mobile device comprises:

analyzing, by one or more computer processors, one or more calendar entries on the mobile device to determine a location of a future event;

analyzing, by one or more computer processors, historical data on the mobile device to determine one or more first applications typically used by a user of the mobile device when traveling to the location of the future event; and determining, by one or more computer processors, an amount of data minutes used by the one or more first applications when traveling to the location of the future event, based on the analyzed calendar entries and historical data.

3. The computer-implemented method of claim 2, wherein determining a predicted amount of data, wherein the predicted amount of data is a predicted amount of data minutes to be used on a data plan by a mobile device further comprises:

receiving, by one or more computer processors, instructions to adjust the predicted amount of data minutes to be used by the mobile device by a user of the mobile device, wherein the instructions from the user of the mobile device add or remove data minutes.

4. The computer-implemented method of claim 3, wherein determining a predicted amount of data, wherein the predicted amount of data is a predicted amount of data minutes to be used on a data plan by a mobile device further comprises:

monitoring, by one or more computer processors, an antenna of the mobile device over a period of time to determine an amount of data transmitted and received by a second mobile application.

5. The computer-implemented method of claim 4, wherein determining a predicted amount of data, wherein the predicted amount of data is a predicted amount of data minutes to be used on a data plan by a mobile device further comprises:

calculating, by one or more computer processors, the predicted amount of data using the amount of data used by the one or more first applications when traveling to the location of the future event, the adjusted data amount received from the user, and the determined amount of data transmitted and received by the second mobile application.

6. The computer-implemented method of claim 1, further comprising:

upon the mobile device using the recalled data minutes, requesting, by one or more processors, additional data minutes from the data minute pool, wherein the additional data minutes from the data minute pool are added to the allocated data minutes for the mobile device.

7. The method of claim 1, wherein the additional mobile device is not associated with a respective data plan.

8. The method of claim 1, wherein the additional mobile device is associated with a respective data plan that is different from the data plan used by the mobile device.

9. A computer program product comprising:

one or more computer readable storage media and program instructions stored on the one or more computer readable storage media, wherein the one or more computer readable storage media are not transitory signals per se, the stored program instructions comprising:

program instructions to determine a predicted amount of data, wherein the predicted amount of data is a predicted amount of data minutes to be used on a data plan by a mobile device;

program instructions to determine a surplus of allocated data minutes on the data plan based on whether the predicted amount of data minutes is less than an allocated amount of data minutes;

program instructions to, upon determining that there is a surplus of allocated data minutes on the data plan, move the surplus of allocated data minutes to a data minute pool, wherein the data minute pool is stored on a server separate from and accessible by the mobile device;

program instructions to enable a no-charge access point, wherein the no-charge access point provides access to the data minute pool on the server to one or more additional mobile devices without requiring the one or more additional devices to be associated with respective data plans;

program instructions to, upon receiving a request for data minutes from an additional mobile device of the one or more additional mobile devices via the no-charge access point, allocate the requested data minutes to the additional mobile device, wherein allocating the requested data minutes to the additional mobile device includes removing the requested data minutes from the data minute pool and adding the requested data minutes to allocated data minutes for the additional mobile device; and program instructions to, upon reaching a defined data minute limit by the mobile device, recall data minutes from the data minute pool, wherein the recalled data minutes from the data minute pool were previously identified as surplus data minutes, and wherein recalling the recalled data minutes includes removing the recalled data minutes from the data minute pool and re-adding the recalled data minutes to the allocated data minutes for the mobile device.

10. The computer program product of claim 9, wherein the program instructions to determine a predicted amount of data, wherein the predicted amount of data is a predicted amount of data minutes to be used on a data plan by a mobile device comprise:
program instructions to analyze one or more calendar entries on the mobile device to determine a location of a future event;
program instructions to analyze historical data on the mobile device to determine one or more first applications typically used by a user of the mobile device when traveling to the location of the future event; and
program instructions to determine an amount of data minutes used by the one or more first applications when traveling to the location of the future event, based on the analyzed calendar entries and historical data.

11. The computer program product of claim 10, wherein the program instructions to determine a predicted amount of data, wherein the predicted amount of data is a predicted amount of data minutes to be used on a data plan by a mobile device further comprise:
program instructions to receive instructions to adjust the predicted amount of data minutes to be used by the mobile device by a user of the mobile device, wherein the instructions from the user of the mobile device add or remove data minutes.

12. The computer program product of claim 11, wherein the program instructions to determine a predicted amount of data, wherein the predicted amount of data is a predicted amount of data minutes to be used on a data plan by a mobile device further comprise:
program instructions to monitor an antenna of the mobile device over a period of time to determine an amount of data transmitted and received by a second mobile application.

13. The computer program product of claim 12, wherein the program instructions to determine a predicted amount of data, wherein the predicted amount of data is a predicted amount of data minutes to be used on a data plan by a mobile device further comprise:
program instructions to calculate the predicted amount of data using the amount of data used by the one or more first applications when traveling to the location of the future event, the adjusted data amount received from the user, and the determined amount of data transmitted and received by the second mobile application.

14. The computer program product of claim 9, the stored program instructions further comprising:
program instructions to, upon the mobile device using the recalled data minutes, request additional data minutes from the data minute pool, wherein the additional data minutes from the data minute pool are added to the allocated data minutes for the mobile device.

15. A computer system comprising:
one or more computer processors;
one or more computer readable storage media;
program instructions stored on the computer readable storage media for execution by at least one of the one or more processors, the stored program instructions comprising:
program instructions to determine a predicted amount of data, wherein the predicted amount of data is a predicted amount of data minutes to be used on a data plan by a mobile device;
program instructions to determine a surplus of allocated data minutes on the data plan based on whether the predicted amount of data minutes is less than an allocated amount of data minutes;
program instructions to, upon determining that there is a surplus of allocated data minutes on the data plan, move the surplus of allocated data minutes to a data minute pool, wherein the data minute pool is stored on a server separate from and accessible by the mobile device;
program instructions to enable a no-charge access point, wherein the no-charge access point provides access to the data minute pool on the server to one or more additional mobile devices without requiring the one or more additional devices to be associated with respective data plans;
program instructions to, upon receiving a request for data minutes from an additional mobile device of the one or more additional mobile devices via the no-charge access point, allocate the requested data minutes to the additional mobile device, wherein allocating the requested data minutes to the additional mobile device includes removing the requested data minutes from the data minute pool and adding the requested data minutes to allocated data minutes for the additional mobile device; and
program instructions to, upon reaching a defined data minute limit by the mobile device, recall data minutes from the data minute pool, wherein the recalled data minutes from the data minute pool were previously identified as surplus data minutes, and wherein recalling the recalled data minutes includes removing the recalled data minutes from the data minute pool and re-adding the recalled data minutes to the allocated data minutes for the mobile device.

16. The computer system of claim 15, wherein the program instructions to determine a predicted amount of data, wherein the predicted amount of data is a predicted amount of data minutes to be used on a data plan by a mobile device comprise:
program instructions to analyze one or more calendar entries on the mobile device to determine a location of a future event;
program instructions to analyze historical data on the mobile device to determine one or more first applications typically used by a user of the mobile device when traveling to the location of the future event; and
program instructions to determine an amount of data minutes used by the one or more first applications when traveling to the location of the future event, based on the analyzed calendar entries and historical data.

17. The computer system of claim 16, wherein the program instructions to determine a predicted amount of data, wherein the predicted amount of data is a predicted amount of data minutes to be used on a data plan by a mobile device further comprise:
program instructions to receive instructions to adjust the predicted amount of data minutes to be used by the mobile device by a user of the mobile device, wherein the instructions from the user of the mobile device add or remove data minutes.

18. The computer system of claim 17, wherein the program instructions to determine a predicted amount of data, wherein the predicted amount of data is a predicted amount of data minutes to be used on a data plan by a mobile device further comprise:

program instructions to monitor an antenna of the mobile device over a period of time to determine an amount of data transmitted and received by a second mobile application.

19. The computer system of claim 18, wherein the program instructions to determine a predicted amount of data, wherein the predicted amount of data is a predicted amount of data minutes to be used on a data plan by a mobile device further comprise:

program instructions to calculate the predicted amount of data using the amount of data used by the one or more first applications when traveling to the location of the future event, the adjusted data amount received from the user, and the determined amount of data transmitted and received by the second mobile application.

20. The computer system of claim 15, the stored program instructions further comprising:

program instructions to, upon the mobile device using the recalled data minutes, request additional data minutes from the data minute pool, wherein the additional data minutes from the data minute pool are added to the allocated data minutes for the mobile device.

\* \* \* \* \*